United States Patent Office 3,646,119
Patented Feb. 29, 1972

3,646,119
CARBONATION OF α,β-UNSATURATED
CARBONYL COMPOUNDS
Robert Angelo Micheli, Passaic, N.J., assignor to
Hoffmann-La Roche Inc., Nutley, N.J.
No Drawing. Filed July 18, 1969, Ser. No. 860,453
Int. Cl. C07c 61/36
U.S. Cl. 260—514 R                                6 Claims

ABSTRACT OF THE DISCLOSURE

A general procedure for the carbonation of α,β-unsaturated carbonyl compounds utilizes a Group IIa metal lower alkyl carbonate, e.g., magnesium methyl carbonate as the active reagent. Preferred embodiments relate to the carbonation of 5,6,7,7a-tetrahydro-substituted-5-oxo-indanes. The reaction is conducted generally in an inert organic solvent, preferably a non-protonic solvent, such as dimethylformamide or dimethylsulfoxide at elevated temperatures.

BRIEF DESCRIPTION OF THE INVENTION

The present invention relates to a general process for the carbonation of α,β-unsaturated carbonyl compounds utilizing a Group IIa metal lower alkyl carbonate reagent. The products obtained by the practice of the present invention are the corresponding α-carboxyl-α,β-unsaturated carbonyl compounds. It will thus be seen that the present invention provides a general method for introducing a carboxyl group onto the α-carbon atom of an α,β-unsaturated carbonyl compound, e.g., the carboxylation occurs on the unsaturated carbon atom which is adjacent to the carbonyl group.

The process of the present invention can utilize both acyclic and cyclic α,β-unsaturated carbonyl compounds as starting materials. Suitable acyclic starting materials include generally the alkyl or aryl vinyl ketones, e.g., propyl vinyl ketone, butyl vinyl ketone, pentyl vinyl ketone, hexyl vinyl ketone, decyl vinyl ketone, phenyl vinyl ketone, benzyl vinyl ketone, etc. Additionally, the vinyl group may also be substituted with an alkyl or aryl group. It is evident therefore that this process of the present invention is applicable to a wide variety of alicyclic starting materials, it being understood, however, that such starting materials should not contain an additional active hydrogen site since such sites could result in a secondary competing reaction to the carbonation reaction heretofore described.

Similarly, the starting materials of the present invention may encompass α,β-unsaturated carbonyl groups which are contained within cyclic systems, particularly within mono or bicyclic systems. Examples of suitable monocyclic compounds include the cycloalk-2-en-ones such as, for example, 2-cyclopentenone, 2-cyclohexenone, 2-cycloheptenone, 2-cyclooctenone, etc. Suitable bicyclic systems useful in the practice of the present invention include α,β-unsaturated dihydronaphthones and the dihydroindanones, for example. A particularly preferred bicyclic system comprises the dihydroindanones, e.g., substituted 7,7a-dihydro-5(6H)-indanones.

In one preferred aspect of the present invention, the present process can be summarized by the following process scheme:

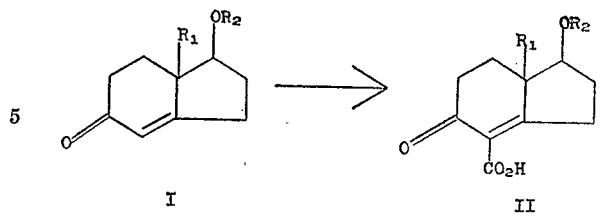

wherein $R_1$ is hydrogen or lower alkyl and $R_2$ is hydrogen, lower alkyl, lower alkyl carbonyl, arylcarbonyl or arylalkyl.

In preferred embodiments $R_1$ is hydrogen, methyl, ethyl or propyl; most preferably, $R_1$ is methyl or ethyl. $R_2$ in preferred embodiments is hydrogen and lower alkyl, most preferably tertiary butyl.

The compounds of Formula II and the optical isomers thereof are useful as intermediates in the total synthesis of steroids of known medicinal importance. This use of compounds of Formula II is described in U.S. Pat. application Ser. No. 765,023, filed Oct. 4, 1968, inventor Zoltan George Hajos, entitled "Stereospecific Total Steroidal Synthesis via Substituted C/D-Trans Indanones" which disclosure is incorporated by reference herein.

The reagent utilized in the present carbonation process can be broadly described as a Group IIa metal lower alkyl carbonate. Suitable Group IIa metals include magnesium, calcium and strontium with magnesium representing the Group IIa metal of preference. A preferred lower alkyl group is methyl; thus, a most preferred carbonation reagent is methyl magnesium carbonate. The carbonation reagent is conveniently prepared by treating to saturation the Group IIa metal alkoxide, e.g., magnesium methoxide, with carbon dioxide in solution, e.g., methanol or dimethylformamide.

The instant carbonation process may be carried out in the presence of an inert organic solvent, most preferably an aprotic organic solvent. Particularly suitable solvents include dimethylformamide and dimethylsulfoxide. It is highly desirable to pass a stream of an inert gas, e.g., nitrogen through the reaction mixture during the course of the reaction. This procedure serves to aid in the removal of lower alkanol, e.g., methanol produced in the course of the reaction.

The carbonation reaction is most conveniently conducted at elevated temperatures although temperature is not broadly critical to the practice of the invention. Thus, suitable reaction temperatures will generally fall within the range between room temperature and the decomposition temperature of the reactants or products employed or obtained. A preferable temperature range is about 50°–130° C., most preferably about 105–115° C.

The proportions of reactants also is not broadly critical to the present process. However, for the purpose of obtaining good yields of carboxyl products, it is highly desirable to utilize a stoichiometric excess of the carbonation reagent; preferably a molar excess of 1.5 to 20 times is utilized, most preferably a molar excess of 8 to 12 is employed.

As used herein, the term "alkyl" comprehends straight or branched chain hydrocarbon groups having from 1–15 carbon atoms; whereas the term "lower alkyl" includes alkyl groups having from 1 to 7 carbon atoms. Examples of suitable "lower alkyl" groups include methyl, ethyl, propyl, n-butyl, t-butyl, and pentyl group, among others.

The term "aryl" includes aromatic cyclic hydrocarbon such as phenyl or phenyl substituted with alkyl, nitro, halo, alkoxy, etc.

The following examples are for the purpose of further illustrating the present invention. All temperatures stated are in degrees centigrade.

EXAMPLE 1

A total of 5.0 g. (22.5 mM.) of (+)-1β-t-butoxy-7,7a-dihydro-7aβ-methyl-5(6H)-indanone was dissolved in 90 ml. (210 mM.), of a 2.3 M magnesium methyl carbonate solution in dimethylformamide prepared by the procedure of H. L. Finkbeiner and G. W. Wagner, J.O.C., 28, 216 (1963), and heated and stirred at 110° for 1 hour while a slow stream of $N_2$ was bubbled through the solution. The reaction mixture was poured onto a mixture of 100 ml. of ice, 250 ml. of 2 N HCl, and 150 ml. of benzene. The aqueous phase was separated and extracted with 75 ml. of benzene. The combined benzene solutions were extracted with three 75 ml. and three 15 ml. portions of 5% $NaHCO_3$ solution. The aqueous extracts were acidified with 2 N HCl (to ca. pH 3), and the precipitated product was dissolved in benzene. The benzene phase was washed with sat. NaCl solution, dried ($Na_2SO_4$), filtered, and the solvent removed in vacuo (bath temp. 30°). The crude acid (6.11 g.) was crystallized from ether-petroleum ether (30–60°) chilled to −20°. It was filtered and dried in vacuo at 40° to afford two crops of 3.3 g. and 0.43 g. of (+) - 5,6,7,7a - tetrahydro - 1β-tert.-butoxy-7aβ-methyl-5-oxo-4-indanecarboxylic acid (3.73 g., 62% yield), M.P. 105–110° and 103–108° respectively as pale, yellowish plates.

EXAMPLE 2

A total of 1.0 g. (4.23 mM.) of (±)-1β-t-butoxy-7,7a-dihydro-7aβ-ethyl-5(6H)-indanone was dissolved in 22.1 ml. (50.8 mM.) of a 2.3 M magnesium methyl carbonate solution in dimethylformamide, and heated and stirred at 110° for 1 hour while a slow stream of $N_2$ was bubbled through the solution. The reaction mixture was poured onto a mixture of 100 ml. of ice and 50 ml. of 2 N HCl, and the product extracted with three 50 ml. portions of benzene. The combined benzene solutions were extracted with six 25 ml. portions of 5% $NaHCO_3$ solution. The aqueous extracts were chilled in an ice-bath and acidified with 50 ml. of 2 N HCl (to ca. pH 3) and the turbid solution was then extracted with three 50 ml. portions of benzene. The benzene phase was washed with 50 ml. of sat. NaCl solution, dried ($Na_2SO_4$), filtered, and the solvent removed in vacuo (bath temp. 35°). The crude acid (1.08 g.), a yellow solid, was crystallized from ether-petroleum ether (30–60°) chilled to −20°. The product was collected, dried in vacuo at 65°, and 0.76 g. (64%) of (±) - 5,6,7,7a-tetrahydro-1β-tert-butoxy-7aβ—ethyl-5-oxo-4-indanecarboxylic acid was obtained, M.P. 128–132° with sintering. This material was recrystallized to yield the aforesaid product as colorless crystals, M.P. 128–132° with sintering. This melting point varied with the manner of heating. The aforesaid melting point was obtained by insertion into a bath at 120° and heating at a rate of 2°/min.

EXAMPLE 3

A total of 1.0 g. (6.01 mM.) of (+)-1β-hydroxy-7,7a-dihydro-7aβ—methyl-5(6H)-indanone was dissolved 31.4 ml. of a 2.3 M magnesium methyl carbonate solution in dimethylformamide and heated and stirred at 110° for 1 hour while a slow stream of $N_2$ was bubbled through the solution. The reaction mixture was poured onto a mixture of 100 ml. of ice and 75 ml. of 2 N HCl, and the product extracted with 1× 75 ml. and 3× 50 ml. portions of benzene. The combined benzene solutions were extracted with six 25 ml. portions of 5% $NaHCO_3$ solution. The aqueous extracts were chilled in an ice bath and acidified with 50 ml. of 2 N HCl (to ca. $pH_3$) and the solution was then extracted with three 50 ml. portions of benzene. The benzene was washed with 50 ml. of sat. NaCl solution, dried ($Na_2SO_4$), filtered and the solvent removed in vacuo (bath temp. 35°). The crude acid (5 mg.), a yellow solid, was crystallized from ether-petroleum ether (30–60°) chilled to −20°. The product was collected, dried in vacuo at 65° and (+)-5,6,7,7a-tetrahydro - 1β - hydroxy-7aβ—methyl-5-oxo-4-indanecarboxylic acid was obtained, M.P. 157–158° (dec.) (sample inserted when bath temperature was 155°).

I claim:

1. A process for the preparation of a compound of the formula

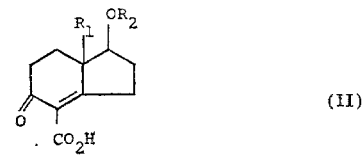

wherein $R_1$ is hydrogen or lower alkyl and $R_2$ is hydrogen, lower alkyl, lower alkyl carbonyl, arylcarbonyl or arylalkyl which process comprises treating a compound of the formula

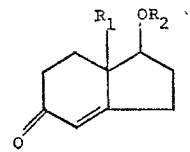

wherein $R_1$ and $R_2$ are as above with methyl magnesium carbonate at elevated temperature in the presence of an aprotic inert organic solvent.

2. The process of claim 1 wherein $R_1$ is lower alkyl.

3. The process of claim 2 wherein $R_1$ is methyl and $R_2$ is hydrogen.

4. The process of claim 2 wherein $R_1$ is methyl and $R_2$ is tertiary-butyl

5. The process of claim 2 wherein $R_1$ is ethyl and $R_2$ is tertiary-butyl.

6. The process of claim 1 wherein said aprotic inert organic solvent is dimethyl formamide and said elevated temperature is in the range between about 50–130° C.

References Cited

FOREIGN PATENTS 933,868  8/1963  Great Britain _____ 260—468

OTHER REFERENCES

Pelletier et al., J. Org. Chem. 31, 1747 (1966).

House, Modern Synthetic Reactions, pp. 190–192 (1965).

LORRAINE A. WEINBERGER, Primary Examiner

R. GERSTL, Assistant Examiner

U.S. Cl. X.R.

260—471 R, 473 R, 476 C, 488 B, 520